US006521879B1

(12) United States Patent
Rand et al.

(10) Patent No.: US 6,521,879 B1
(45) Date of Patent: Feb. 18, 2003

(54) METHOD AND SYSTEM FOR CONTROLLING AN LED BACKLIGHT IN FLAT PANEL DISPLAYS WHEREIN ILLUMINATION MONITORING IS DONE OUTSIDE THE VIEWING AREA

(75) Inventors: Ryan J. Rand, Mt. Vernon, IA (US); Gary D. Bishop, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/839,008

(22) Filed: Apr. 20, 2001

(51) Int. Cl.[7] .................................................. G01J 1/32

(52) U.S. Cl. ....................... 250/205; 345/102; 315/157; 362/561

(58) Field of Search ................................ 250/205, 204; 345/102, 5; 349/116, 61–71; 315/155–159, 151; 362/800, 31, 561, 252, 249, 236, 276

(56) References Cited

U.S. PATENT DOCUMENTS

| | | | | | |
|---|---|---|---|---|---|
| 4,342,906 | A | * | 8/1982 | Hyatt | 250/205 |
| 4,573,766 | A | * | 3/1986 | Bournay, Jr. et al. | 350/345 |
| 5,008,658 | A | * | 4/1991 | Russay et al. | 340/784 |
| 5,012,314 | A | * | 4/1991 | Tobita et al. | 357/23.12 |
| 5,272,327 | A | * | 12/1993 | Mitchell et al. | 250/205 |
| 5,359,345 | A | * | 10/1994 | Hunter | 345/102 |
| 6,107,985 | A | * | 8/2000 | Walukas et al. | 345/102 |
| 6,160,596 | A | * | 12/2000 | Sylvester et al. | 349/61 |
| 6,207,943 | B1 | * | 3/2001 | Smelker | 250/205 |
| 6,255,784 | B1 | * | 7/2001 | Weindorf | 315/291 |

OTHER PUBLICATIONS

Application Ser. No. 09/643,586 filed on Aug. 22, 2000, by Thomas J. Thornburg et al. for “Apparatus For Transmitting Light From A Light Source To A Light Dectector.”

* cited by examiner

*Primary Examiner*—Stephone B. Allen
*Assistant Examiner*—Christopher W. Glass
(74) *Attorney, Agent, or Firm*—Nathan O. Jensen; Kyle Eppele

(57) ABSTRACT

A system and method for controlling light emitted by a group of independent strings of LEDs in an LED backlight for a flat panel LCD display, in which optical feedback is used to increase a light output of remaining strings of LEDs when a string fails.

15 Claims, 1 Drawing Sheet

METHOD AND SYSTEM FOR CONTROLLING AN LED BACKLIGHT IN FLAT PANEL DISPLAYS WHEREIN ILLUMINATION MONITORING IS DONE OUTSIDE THE VIEWING AREA

CROSS-REFERENCE TO RELATED APPLICATION

This application is related to an application entitled "APPARATUS FOR TRANSMITTING LIGHT FROM A LIGHT SOURCE TO A LIGHT DETECTOR" having Ser. No. 09/643,586 and filed on Aug. 22, 2000 by Thomas J. Thornburg et al and assigned to the same assignee. This application is hereby incorporated by reference in its entirety by this reference.

FIELD OF THE INVENTION

The present invention generally relates to flat panel displays, and more particularly relates to flat panel displays having an LED backlight, and even more particularly relates to methods and systems for controlling failure mode operations of LEDs in a flat panel display.

BACKGROUND OF THE INVENTION

Recently, it has been proposed to use light emitting diodes (LEDs) to backlight liquid crystal displays (LCDs). It also has been proposed to utilized many strings of individual LEDs operating in series. Because an entire string of LEDs may fail if just one LED therein fails, or another single fault in the string occurs, designers have proposed to arrange the individual LEDs of each string in a widely scattered distribution. With this dispersion of individual LEDs in each string, the failure of a single string will not result in a visibly dark spot on the display, which would otherwise occur if the strings were arranged in concentrated groups.

While this design of employing widely scattered individual LEDs in each string has been used in the past, it does have some drawbacks. First of all, when a string fails, there is a slight reduction in the total brightness produced by the backlight. If many strings are used in a display, this degradation of brightness resulting from a single string failure may be slight and barely perceivable. In such situations, if another string were to fail, the brightness would again be reduced further. If the failures occur serially, i.e., one at a time, the viewer may not immediately recognize that one or more of the strings has failed. The backlight performance could continue to gradually decline until the brightness of the display becomes a serious problem. Secondly, if only a limited number of strings is used in the display, the failure of a single string will result in an immediately detectable degradation in backlight brightness. In certain critical applications, such as aviation electronics, this can be a serious problem.

Consequently, there exists a need for improved methods and systems for operating strings of widely dispersed individual LEDs in an efficient manner.

SUMMARY OF THE INVENTION

It is an object of the present invention to provide a system and method for operating an LED backlight in an efficient manner.

It is a feature of the present invention to utilize an optical feedback system.

It is another feature to include a dedicated sensor LED in each string of LEDs in the display backlight.

It is another feature of the present invention to include light sensor which measures the combined output of numerous sensor LEDs from the numerous LED strings.

It is yet another feature of the present invention to include a current measuring device in each of the strings for indicating that a string has failed.

It is an advantage of the present invention to achieve improved efficiency in operating LED backlights when a failure of a string occurs.

The present invention is an apparatus and method for controlling an LED backlight during failure modes, which is designed to satisfy the aforementioned needs, provide the previously stated objects, include the above-listed features, and achieve the already articulated advantages. The present invention is carried out in a "dimming-less" manner in a sense that the adverse effects of an immediate dimming, upon the occurrence of a string failure, of the overall display brightness, have been greatly reduced.

Accordingly, the present invention is a system and method including an optical feedback mechanism which utilizes at least one LED in each string as an optical source for an optical brightness monitor.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
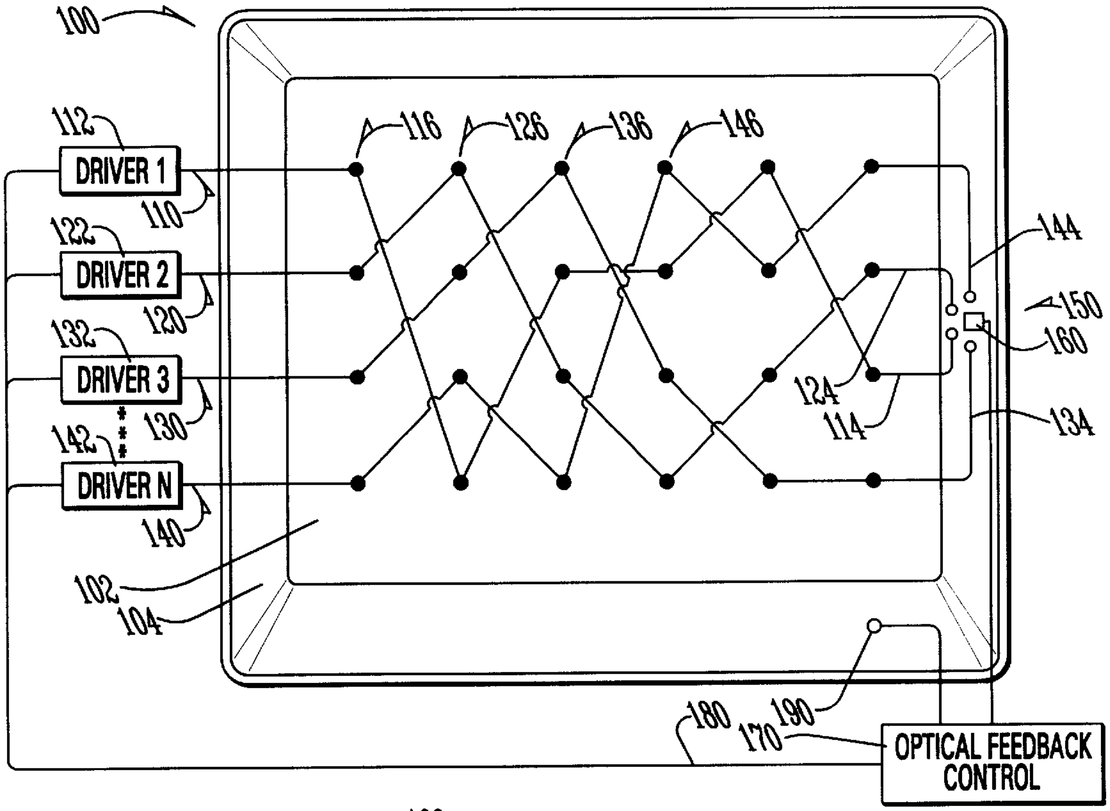
FIG. 1 is a simplified block diagram view of a system of the present invention.

Now referring to the drawings wherein like numerals refer to like matter throughout, and more particularly to FIG. 1, there is shown a flat panel display backlight system of the present invention generally designated 100, including a backlight viewing area 102, which may be disposed behind a viewing area of an LCD display. Backlight viewing area 102 is shown having a bezel covered area 104 adjacent thereto which may be typically covered by a bezel around an LCD or is otherwise not visible through the display. Backlight 100 includes a plurality of strings of LEDs, each of which has a plurality of widely scattered individual LEDs therein. More specifically, there is shown first LED string 110, which includes first LED driver 112, which is well known in the art, and a first string sensor LED 114, which is preferably disposed at the end of the first LED string 110 and preferably disposed in bezel covered area 104 or another location which does not obstruct the light through the display. Disposed between first LED driver 112 and first string sensor LED 114 is first string viewing area components 116. First string viewing area components 116 are preferably individual LEDs which are well known in the art. First string viewing area components 116 may be coupled by wires, traces or other known techniques.

Also shown in the Figure is second LED string 120, second LED driver 122, second string sensor LED 124, second string viewing area components 126, third LED string 130, third LED driver 132, third string sensor LED 134, third string viewing area components 136, Nth LED string 140, Nth LED driver 142, Nth string sensor LED 144, and Nth string viewing area components 146.

First string sensor LED 114, second string sensor LED 124, third string sensor LED 134 and Nth string sensor LED 144 are shown disposed together in a light sensing assembly 150, which has a centrally disposed photodetector 160. Any type of photodetector can be used, and any arrangement of LEDs could be used as well. However, it may be preferred to use a circular array of LEDs around a central photodetector and a reflective dome (not shown) disposed over top of the light sensing assembly 150. Such a light detecting assembly is described in co-pending application entitled "APPARATUS FOR TRANSMITTING LIGHT FROM A LIGHT SOURCE TO A LIGHT DETECTOR" having Ser. No. 09/643,586 and filed on Aug. 22, 2000 by Thomas J. Thornburg et al. and assigned to the same assignee. This application is hereby incorporated by reference in its entirety by this reference.

Photodetector 160 is coupled to optical feedback control 170, which generates control signals responsive to the light levels detected by photodetector 160 and supplies these control signals, via optical feedback line 180 to first LED driver 112, second LED driver 122, third LED driver 132, and Nth LED driver 142. When a light string fails, the overall brightness detected by photodetector 160 will decrease because one of the LEDs being monitored by the photodetector 160 will no longer contribute to the light incident upon photodetector 160. Optical feedback control 170 can be any type of control device which is believed to be readily made for each particular application by a person skilled in the art. Optical feedback control 170 would provide control signals which command the remaining strings of LEDs to operate at a higher level of output. This will compensate for the loss in brightness due to the failed string.

In one possible embodiment of the present invention, it may be desirable to provide a visual indication to the viewer of the display that one of the LED strings has failed. This could be done so that the viewer would be advised to have the backlight serviced or replaced. Failure mode indicator LED 190 is shown coupled to optical feedback control 170. Failure mode indicator LED 190 could be commanded by optical feedback control 170 to illuminate at varying levels of brightness depending upon the number of strings of LEDs that may have failed. As more strings fail, failure mode indicator LED 190 can be made to become brighter and brighter.

Figure 2:
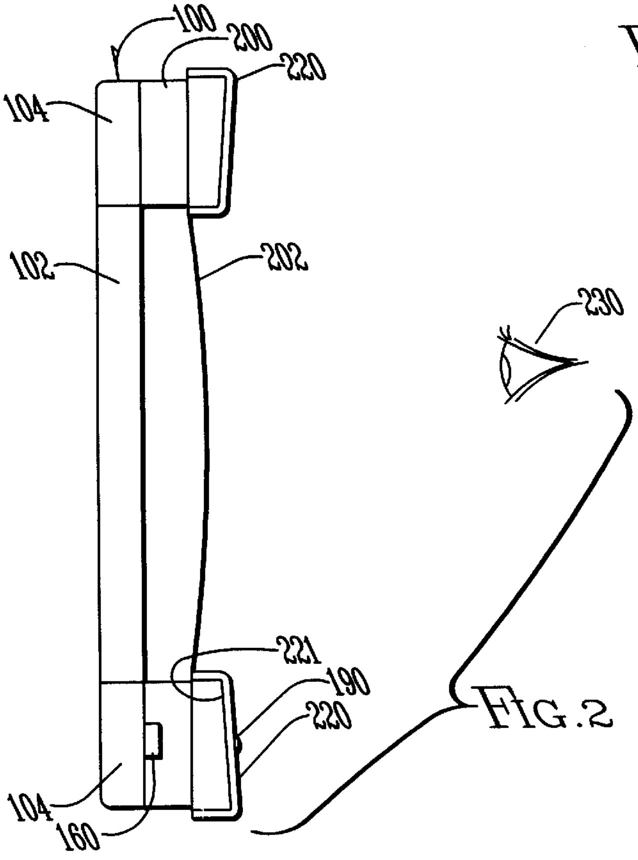
FIG. 2 is a side view of a portion of the backlight and LCD combination of the present invention.

Now referring to FIG. 2, there is shown a side view of the present invention, including the backlight 100, an LCD array 200 and a bezel 220. A display viewing window 202 is shown adjacent the backlight viewing area 102 and within the bezel 220. Failure mode indicator LED 190 is shown disposed on a side of the assembly closest to the viewer 230 and outside of said display viewing window 202. Said bezel 220 may have a reflective inside surface 221 which forms a reflective dome for reflecting light from first string sensor LED 114, second string sensor LED 124, third string sensor LED 134 and Nth string sensor LED 144 into photodetector 160. In the alternative, an independent dedicated reflective dome could be employed as well.

In operation, the apparatus and method of the present invention as described in FIGS. 1 and 2, could function as follows:

1. Several independent strings of LEDs (first LED string 110, second LED string 120, third LED string 130 and Nth LED string 140) are provided across a backlight viewing area 102 of a backlight for a flat panel display 100;
2. One of the LEDs (first string sensor LED 114, second string sensor LED 124, third string sensor LED 134 and Nth string sensor LED 144) in each string is disposed so that light emitting therefrom is incident upon a photodetector 160.
3. Photodetector 160 monitors the overall light level and generates a signal representative of that light level.
4. Optical feedback control 170 receives the light level signal from photodetector 160 and generates a control signal in response thereto. If the level of brightness declines because of a failure of one of the strings of LEDs, then optical feedback control 170 will command the remaining operational strings to produce more light. This control varies, depending upon the number of failed strings of LEDs and the light output.
5. The control signal is provided, via optical feedback line 180 to the drivers, first LED driver 112, second LED driver 122, third LED driver 132, and Nth LED driver 142.
6. Optionally, a visual indication of a failure of a string is provided by optical feedback control 170 commanding failure mode indicator LED 190 to increase its brightness when the control signal on optical feedback line 180 is causing the remaining strings to produce more light. Other methods of communicating a failure of a string are envisioned, such as but not limited to: generation of a digital message which is delivered to a maintenance computer or an e-mail to a service center.

Throughout this description, reference is made to widely scattered or randomly dispersed LEDs in each string, because it is believed that the beneficial aspects of the present invention would be most readily apparent when used in connection with such strings; however, it should be understood that the present invention is not intended to be limited to random or widely scattered strings and should be hereby construed to include linear strings and other non-random strings as well.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

What is claimed is:

1. An apparatus comprising:

a driven array of LEDs adapted and configured as a backlight for a flat panel display; said driven array of LEDs comprising a first LED string, having a first LED driver, a first string sensor LED and a plurality of first string viewing area component LEDs disposed therebetween, a second LED string, having a second LED driver, a second string sensor LED and a plurality of second string viewing area component LEDs disposed therebetween, and a third LED string, having a third LED driver, a third string sensor LED and a plurality of third string viewing area component LEDs disposed therebetween, wherein said pluralities of first, second and third string viewing area component LEDs are disposed within a viewing area that is substantially aligned with a display viewing window of a flat panel display, said pluralities of first, second, and third string viewing area component LEDs arranged and collectively configured to emit light to provide backlighting for the flat panel display, and wherein said first, second and third string sensor LEDs are positioned outside of the viewing area such that light emitted therefrom does not substantially contribute to the backlighting of the flat panel display;

a light sensing assembly, having therein a photodetector positioned outside of the viewing area and adjacent the first, second and third string sensor LEDs, said photodetector adapted and configured for detecting light emitted, from outside said viewing area, by said first string sensor LED, said second string sensor LED, and said third string sensor LED;

an optical feedback control which is adapted and configured to receive a detected light level signal from said photodetector and generate a commanded output signal in response thereto; and, an optical feedback line adapted and configured to carry said commanded output signal to said first LED driver, said second LED driver, and said third LED driver.

2. An apparatus of claim 1 wherein said photodetector is disposed centrally among said first string sensor LED, said second string sensor LED and said third string sensor LED.

3. An apparatus of claim 2 wherein said photodetector is disposed under a reflective dome that reflects light emitted by the first, second and third string sensor LEDs toward the photodetector.

4. An apparatus of claim 3 further comprising a failure mode indicator LED disposed outside said viewing area which is adapted and configured to display a variable indication of a number of failed strings of LEDs in said driven array based on a measurement of light detected by the photodetector.

5. An apparatus comprising:

first means for emitting light, from a plurality of discrete locations, in response to a first driving means, said first means for emitting light including a first plurality of LEDs positioned in a viewing area and a first sensor LED positioned outside of the viewing area;

second means for emitting light, from a plurality of discrete locations, in response to a second driving means, said second means for emitting light including a second plurality of LEDs positioned in the viewing area and a second sensor LED positioned outside of the viewing area;

third means for emitting light, from a plurality of discrete locations, in response to a third driving means, said third means for emitting light including a third plurality of LEDs positioned in the viewing area and a third sensor LED positioned outside of the viewing area;

means for detecting light output from outside of the viewing area, from at least one of the first, second, and third sensor LEDs, wherein said means for detecting light is a photodetector disposed centrally among the first, second and third sensor LEDs; and, means for generating and delivering, to said first driving means, an increased brightness command signal which is responsive to said means for detecting light.

6. An apparatus of claim 5 further comprising: means for shuttering light in response to an input electrical signal.

7. An apparatus of claim 6 wherein said means for shuttering is an LCD having a viewing window.

8. An apparatus of claim 7 wherein said means for generating and delivering is responsive to a failure in at least one of the first, second and third means for emitting light.

9. An apparatus of claim 8 wherein said first plurality of LEDs contains a non-linear arrangement of LEDs.

10. An apparatus of claim 9 wherein said means for detecting light receives reflected light from a reflector disposed between said means for detecting and a viewer location for said LCD, said reflector directing light away from the viewer location.

11. An apparatus of claim 10 further comprising a means, based upon a measurement of the photodetector, for variably visually indicating how many of the first, second, and third plurality of LEDs have failed.

12. A method of controlling an LCD backlight, said backlight including a plurality of strings of LEDs, wherein each of the plurality of strings of LEDs has at least one sensor LED positioned to emit light substantially outside an LCD viewing area, the method comprising the steps of:

monitoring, at a location other than within the LCD viewing area, light emitted by the at least one sensor LED from each of the plurality of strings of LEDs; and, generating a signal commanding each of said plurality of strings of LEDs to produce an increased level of light, in response to a reduction in light level determined through said step of monitoring light level.

13. A method of claim 12 wherein said step of generating a signal is repeated in response to a failure of at least one of the strings of LEDs.

14. A method of claim 13 wherein said step of monitoring includes monitoring only a single LED from each of said plurality of strings of LEDs.

15. A method of claim 14 further comprising the step of generating a variable visible indication which depicts a variable number of failures among said plurality of strings of LEDs.

* * * * *